(12) United States Patent
Nakamura et al.

(10) Patent No.: US 10,315,702 B2
(45) Date of Patent: Jun. 11, 2019

(54) FRONT VEHICLE-BODY STRUCTURE OF VEHICLE

(71) Applicant: MAZDA MOTOR CORPORATION, Hiroshima (JP)

(72) Inventors: Takeshi Nakamura, Hiroshima (JP); Keizo Kawasaki, Hiroshima (JP); Hidenori Matsuoka, Hiroshima (JP); Kenji Maruyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/386,193

(22) Filed: Dec. 21, 2016

(65) Prior Publication Data

US 2017/0203793 A1 Jul. 20, 2017

(30) Foreign Application Priority Data

Jan. 20, 2016 (JP) .................................. 2016-008988

(51) Int. Cl.
| | |
|---|---|
| *B62D 25/08* | (2006.01) |
| *B62D 21/15* | (2006.01) |
| *B62D 25/02* | (2006.01) |
| *B62D 25/04* | (2006.01) |

(52) U.S. Cl.
CPC ........... *B62D 25/08* (2013.01); *B62D 21/152* (2013.01); *B62D 25/025* (2013.01); *B62D 25/04* (2013.01); *B62D 25/081* (2013.01); *B62D 25/082* (2013.01); *B62D 25/088* (2013.01); *B60Y 2304/05* (2013.01); *B60Y 2306/01* (2013.01); *B60Y 2410/124* (2013.01)

(58) Field of Classification Search
CPC .... B62D 25/163; B62D 21/11; B62D 21/155; B62D 25/025; B62D 25/04; B62D 25/081; B62D 25/2018
USPC ... 296/193.09, 187.09, 193.11, 203.02, 1.08, 296/193.04, 193.1, 198, 209; 280/124.109, 728.3, 759, 769; 180/291, 180/377, 68.4
See application file for complete search history.

(56) References Cited

U.S. PATENT DOCUMENTS

| | | | | |
|---|---|---|---|---|
| 4,717,198 A | * | 1/1988 | Komatsu .............. | B62D 25/088 296/192 |
| 5,031,958 A | * | 7/1991 | Fujita ................... | B62D 25/082 180/89.1 |
| 5,061,009 A | * | 10/1991 | Harasaki .............. | B62D 25/081 296/192 |

(Continued)

FOREIGN PATENT DOCUMENTS

JP 2009-255705 A 11/2009

*Primary Examiner* — D Glenn Dayoan
*Assistant Examiner* — Sunsurraye Westbrook
(74) *Attorney, Agent, or Firm* — Studebaker & Brackett PC

(57) ABSTRACT

There are provided a hinge pillar extending in a vehicle vertical direction, an apron reinforcement extending forward from the hinge pillar, a connecting member provided below the apron reinforcement and connecting the hinge pillar and the apron reinforcement in a brace shape, a dash panel provided in back of the connecting member and extending in a vehicle width direction, a wheel house provided in front of the dash panel, and an apron rear panel provided on an inward side, in the vehicle width direction, of and closely to the connecting member and connecting a rear portion of the wheel house and the dash panel.

18 Claims, 16 Drawing Sheets

(56) References Cited

U.S. PATENT DOCUMENTS

| | | | | |
|---|---|---|---|---|
| 7,140,674 B2 * | 11/2006 | Miyoshi | ............... | B62D 25/04 |
| | | | | 296/203.03 |
| 7,407,220 B2 * | 8/2008 | Kanagawa | ........... | B62D 25/088 |
| | | | | 296/187.09 |
| 2006/0097533 A1 * | 5/2006 | Watanabe | ........... | B62D 25/025 |
| | | | | 296/30 |
| 2007/0252412 A1 * | 11/2007 | Yatsuda | ............... | B62D 25/082 |
| | | | | 296/193.09 |

\* cited by examiner

FRONT VEHICLE-BODY STRUCTURE OF VEHICLE

BACKGROUND OF THE INVENTION

The present invention relates to a front vehicle-body structure of a vehicle.

In general, in a vehicle frontal collision, an impact load is absorbed by crushing of a pair of right-and-left front side frames which are provided to extend in a vehicle longitudinal direction at a front portion of a vehicle body, and deformation of a cabin is suppressed by dispersing of the impact load to various parts of the vehicle body by way of the front side frames.

Herein, in a case where there happens a so-called small overlap collision in that a specified area of the vehicle body which is positioned on an outward side, in a vehicle width direction, of the front side frame (an area covering about 25% of an entire width of the vehicle body) and a collision object overlap each other in a vehicle width direction, when viewed from a vehicle front side, a front wheel arranged in the overlap area retreats relative to the vehicle body and an impact load is inputted from the front wheel to a hinge pillar, thereby causing deformation of a cabin.

Japanese Patent Laid-Open Publication No. 2009-255705 discloses a structure which can suppress the deformation of the cabin caused by the above-described small overlap collision, for example. That is, an apron reinforcement which extends forward from an upper end portion of a hinge pillar and a hinge pillar are interconnected by a connecting member in a brace shape, so that the connection rigidity of the apron reinforcement and the hinge pillar is increased. Further, a partitioning member is arranged in a closed cross section of the hinge pillar at a positon located at the same level as a connection portion with the above-described connecting member, so that the rigidity of the hinge pillar is increased.

According to the vehicle-body structure of the above-described patent document, the front wheel which have retreated relatively in the small overlap collision contacts the connecting member, so that the impact load inputted to the connecting member is dispersed to the hinge pillar and the apron reinforcement, and further dispersed from the hinge pillar toward a rearward side of the vehicle body by way of the side sill, the front pillar, and others. Moreover, since the hinge pillar portion to which the impact load is inputted from the front wheel by way of the connecting member is reinforced by the partitioning member, the above-described load dispersion toward the rearward side of the vehicle body by way of the side sill, the front pillar, and others is achieved properly, thereby suppressing the deformation of the cabin.

In a conventional countermeasure against the above-described small overlap collision, however, the impact load inputted from the front wheel to the hinge pillar side by way of the connecting member is intensively transmitted along a transmission path extending rearward which is formed by the side sill, the front pillar, and others, so that there is room for improvement in attaining the dispersion of the impact load.

SUMMARY OF THE INVENTION

Accordingly, an object of the present invention is to provide a front vehicle-body structure of a vehicle which can enhance an effect of the load dispersion to various parts of the vehicle body when the impact load to cause the front wheel to retreat relatively is inputted from the forward side of the vehicle body.

The present invention is a front vehicle-body structure of a vehicle, comprising a hinge pillar extending in a vehicle vertical direction, an apron reinforcement extending forward from the hinge pillar, a connecting member provided below the apron reinforcement and connecting the hinge pillar and the apron reinforcement in a brace shape, a dash panel provided in back of the connecting member and extending in a vehicle width direction, a wheel house provided in front of the dash panel, and an apron rear panel provided on an inward side, in the vehicle width direction, of and closely to the connecting member and connecting a rear portion of the wheel house and the dash panel.

According to the present invention, when the impact load to cause the front wheel to retreat relative to the vehicle body is inputted from the forward side of the vehicle body, the impact load inputted to the connecting member connecting the hinge pillar and the apron reinforcement in the brace shape is dispersed to a rearward side of the vehicle body by way of the hinge pillar and the side sill, the front pillar and others which are positioned in back of the hinge pillar, and also dispersed to an inward side, in the vehicle width direction, of the vehicle body by way of the apron rear panel and the dash panel which are arranged on the inward side of and closely to the connecting member. Accordingly, the impact load can be effectively dispersed to various parts of the vehicle body, thereby suppressing the deformation of the cabin.

In an embodiment of the present invention, a first reinforcing member is provided in a closed cross section which is formed by the connecting member, and the apron rear panel is provided on the inward side, in the vehicle width direction, of and closely to the first reinforcing member substantially at the same level as the first reinforcing member.

According to this embodiment, since the first reinforcing member is provided in the closed cross section formed by the connecting member, the rigidity of the connecting member is increased and also the impact load inputted to the connecting member from the front wheel is effectively transmitted to the apron rear panel from the portion reinforced by the first reinforcing member. Accordingly, the above-described load dispersion to the various parts of the vehicle body can be achieved effectively, thereby effectively suppressing the deformation of the cabin.

In another embodiment of the present invention, the first reinforcing member is a partitioning member which partitions a space of the closed cross section into upper and lower parts.

According to this embodiment, since the partitioning member which partitions the space of the closed cross section into the upper and lower parts is used as the first reinforcing member, the above-described reinforcement by means of the connecting member and the above-described load dispersion to the apron rear panel can be achieved effectively, attaining material-cost reduction of the first reinforcing member.

In another embodiment of the present invention, the connecting member comprises a first connecting member which extends forward from a portion of the hinge pillar which is positioned below the apron reinforcement and a second connecting member which connects a front end portion of the first connecting member and the apron reinforcement, and the apron rear panel is provided roughly horizontally substantially at the same level at an upper face portion of the first connecting member.

According to this embodiment, the impact load inputted to the first and second connecting members from the front wheel which has retreated relatively is effectively transmitted to the apron rear panel from the upper face portion of the first reinforcing member. Accordingly, the above-descried load dispersion to the various parts of the vehicle body can be achieved effectively, thereby effectively suppressing the deformation of the cabin.

In another embodiment of the present invention, a second reinforcing member is provided to extend in the vehicle width direction along a front face of the dash panel and forms a closed cross section between the dash panel and the second reinforcing member, and the apron rear panel is provided such that the apron rear panel overlaps the second reinforcing member when viewed from a forward side of the vehicle.

Herein, the terminology of "overlap" which is used in the present specification means that at least a portion of one of the members and at least a portion of the other member overlap each other.

According to this embodiment, when the impact load is inputted to the connecting member from the front wheel which has retreated relatively, the load dispersed to the apron rear panel from the connecting member can be effectively transmitted inward to frames of the vehicle body, such as a floor tunnel, by way of the second reinforcing member joined the front face of the dash panel. Accordingly, the load dispersion to the various parts of the vehicle body can be achieved more effectively, thereby more effectively suppressing the deformation of the cabin.

In another embodiment of the present invention, the above-described front vehicle-body structure of the vehicle further comprises a side panel constituting a vehicle-body side face portion, and a third reinforcing member provided in a brace shape to extend between a back face of the dash panel and an inward face, in the vehicle width direction, of the side panel, wherein the apron rear panel is provided such that the apron rear panel overlaps the third reinforcing member when viewed from the forward side of the vehicle.

According to this embodiment, when the impact load is inputted to the connecting member from the front wheel which has retreated relatively, the load dispersed to the apron rear panel by way of the connecting member and the apron rear panel can be transmitted to the side panel positioned in back of the dash panel by way of the third reinforcing member. Accordingly, the load dispersion to the various parts of the vehicle body can be achieved more effectively, thereby more effectively suppressing the deformation of the cabin.

In another embodiment of the present invention, a fourth reinforcing member is provided in a closed cross section of the hinge pillar such that the fourth reinforcing member is positioned in back of and closely to a joint portion of the hinge pillar and the connecting member.

According to this embodiment, since the rigidity of the hinge pillar is increased by the fourth reinforcing member provided in the closed cross section of the hinge pillar, the impact load inputted to the high-rigidity portion of the hinge pillar from the front wheel which has retreated relatively by way of the connecting member can be effectively dispersed to the various parts of the vehicle body from the hinge pillar by way of the side sill, the front pillar and others, thereby effectively suppressing the deformation of the cabin.

In another embodiment of the present invention, the fourth reinforcing member is a partitioning member which partitions an inner space of the hinge pillar into upper and lower parts.

According to this embodiment, since the partitioning member which partitions the inner space of the hinge pillar into the upper and lower parts is used as the fourth reinforcing member, the above-described load dispersion to the various parts of the vehicle body from the connecting member by way of the hinge pillar can be achieved effectively, attaining material-cost reduction of the fourth reinforcing member.

Other features, aspects, and advantages of the present invention will become apparent from the following description which refers to the accompanying drawings.

DETAILED DESCRIPTION OF THE INVENTION

Figure 1:
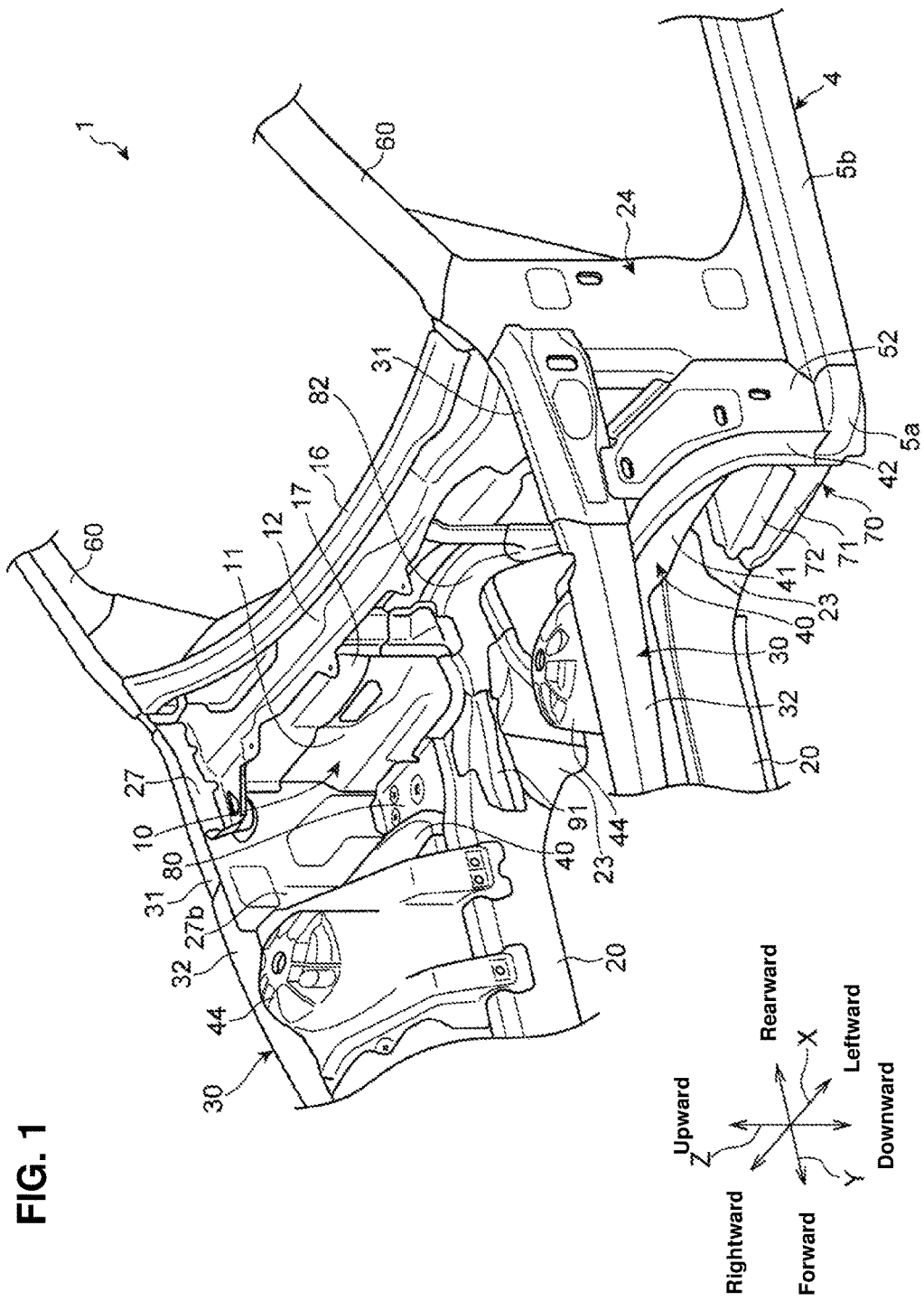
FIG. 1 is a perspective view showing a front vehicle-bod structure of a vehicle according to a first embodiment of the present invention.

Hereafter, embodiments of a front vehicle-body structure of a vehicle according to the present invention will be described specifically referring to the accompanying drawings. Herein, unless otherwise described in particular, the terminologies which show directions, such as of "forward," "rearward," "rightward," "leftward," "upward," and "downward," mean respective directions of a vehicle body in a state where an advancing direction of a vehicle traveling is considered as "forward." Further, in the accompanying drawings, reference character "X" is added to show a vehicle width direction, reference character "Y" is added to show a vehicle longitudinal direction, and reference character "Z" is added to show a vehicle vertical direction.

Embodiment 1

As shown in FIGS. 1-4, an automotive vehicle 1 which is provided with a front vehicle-body structure according to a first embodiment comprises a front panel 2 (see FIG. 4), a pair of right-and-left side sills 4, a dash panel 10, a pair of right-and-left side inner panels 27, a pair of right-and-left hinge pillars 24, a pair of right-and-left front side frames 20, a pair of right-and-left apron reinforcements 30, and a pair of right-and-left wheel houses 40.

The side sills 4 are provided to extend in the vehicle longitudinal direction along both end portions, in the vehicle width direction, of the floor panel 2. The side sill 4 comprises a side sill outer 5 (5a, 5b) having a hat-shaped cross section which opens inward in the vehicle width direction X and a side sill inner 6 having a hat-shaped cross section which opens outward in the vehicle width direction X. The side sill outer 5 is split into a front side sill outer 5a forming a front end portion thereof and a rear side sill outer 5b extending rearward from a rear end portion of the front side sill outer 5a. The rear side sill outer 5b is joined to an outward side, in the vehicle width direction X, of the side sill inner 6, so that a closed cross section continuous in the vehicle longitudinal direction Y is formed between the rear side sill outer 5b and the side sill inner 6. In the present specification, this closed cross section will be referred to as "the closed cross section of the side sill 4."

The dash panel 10 is provided to extend in the vehicle width direction X between the right-and-left hinge pillars 24, whereby a cabin space and an engine room is portioned in the vehicle longitudinal direction Y. The dash panel 10 comprises a dash panel lower 11 which rises upward from a front end portion of the floor panel 2 and a dash panel upper 12 which is joined to an upper end portion of the dash panel lower 11.

A band-shaped reinforcing panel 17 which extends in the vehicle with direction X is joined to a front face of an upper portion of the dash panel lower 11. An upper end portion of the reinforcing panel 17 is joined to a lower face of the dash panel upper 12. A cowl inner panel 15 which extends in the vehicle width direction X is joined to a rear end portion of the dash panel upper 12, and a cowl outer panel 16 which extends in the vehicle width direction X is joined to a forward side of the cowl inner panel 15.

The side inner panel 27 is a member which forms a side face portion of a front portion of the vehicle body. The side inner panel 27 forms a hinge pillar inner 27a at a portion thereof which is positioned in back of the dash panel lower 11 and forms a cowl side panel 27b at a portion thereof which is positioned in front of the dash panel lower 11.

Herein, the hinge pillar inner 27a and the cowl side panel 27b may be made of different members from each other. Further, the hinge pillar inner 27a may be composed of plural members, and the cowl side panel 27b may be composed of plural members.

The hinge pillar 24 is provided to extend upward from the vicinity of a front end of the side sill 4. The hinge pillar 24 is provided in back of the front side sill outer 5a. The hinge pillar 24 comprises a hinge pillar inner 27a and a hinge pillar outer 25 which is provided on the outward side of the hinge pillar inner 27a.

Figure 6:
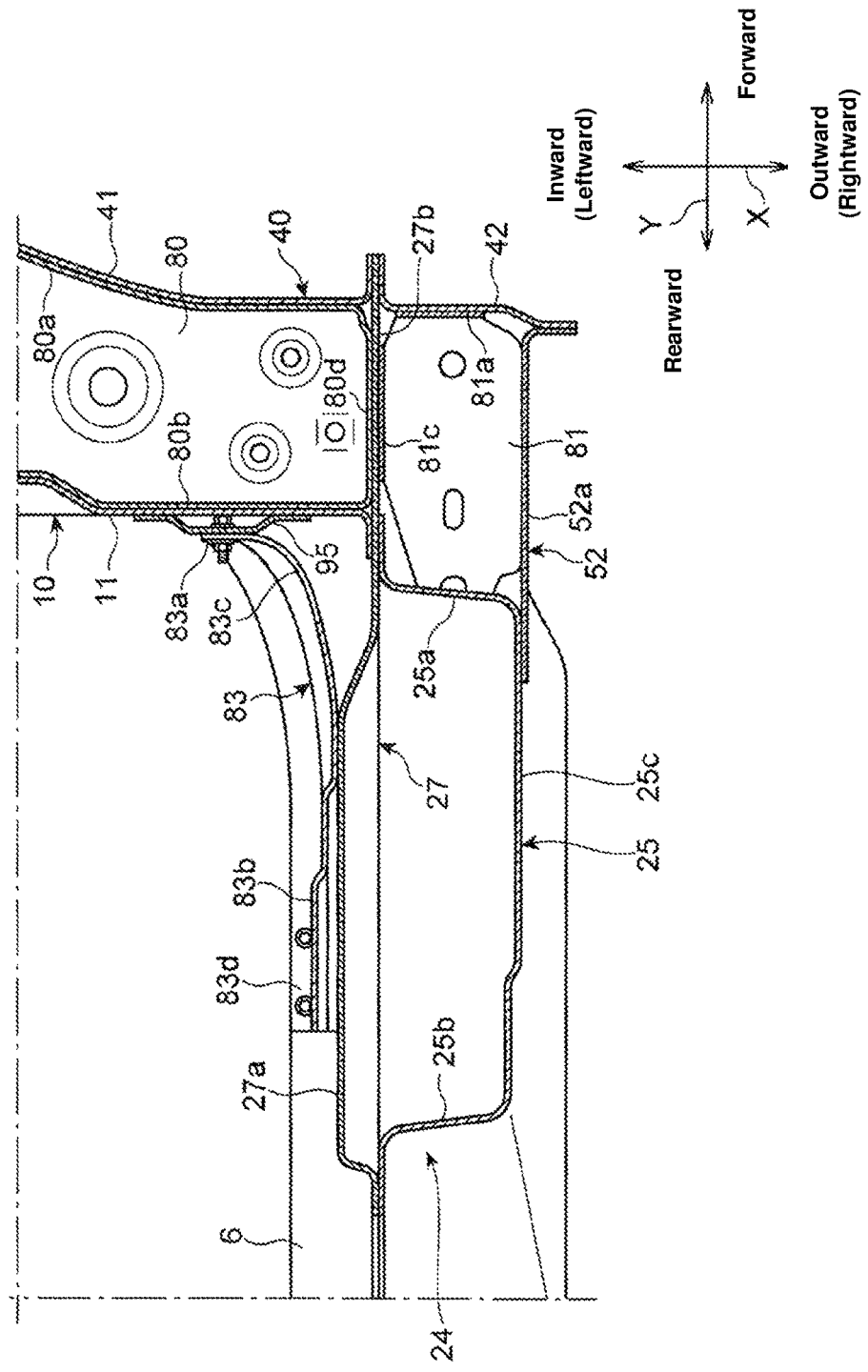
FIG. 6 is a sectional view taken along line B-B of FIG. 2, which shows an apron rear panel and its surrounding portion, when viewed from an upward side.

As shown in FIG. 6, the hinge pillar outer 25 comprises a side face portion 25c which is provided on the outward side, in the vehicle width direction X, of the hinge pillar inner 27a, being spaced apart from the hinge pillar inner 27a, a front face portion 25a which extends inward, in the vehicle width direction X, from a forward edge portion of the side face portion 25c, and a rear face portion 25b which extends inward, in the vehicle width direction X, from a rearward edge portion of the side face portion 25c, which is configured to have a hat-shaped cross section which opens inward in the vehicle width direction X as a whole. Respective inward end portions, in the vehicle width direction X, of the front face portion 25a and the rear face portion 25b are joined to the hinge pillar inner 27a, whereby a closed cross section which is continuous in the vehicle vertical direction Z is formed between the hinge pillar outer 25 and the hinge pillar inner 27a. In the present specification, this closed cross section will be referred to as "the closed cross section of the hinge pillar 24."

Figure 2:
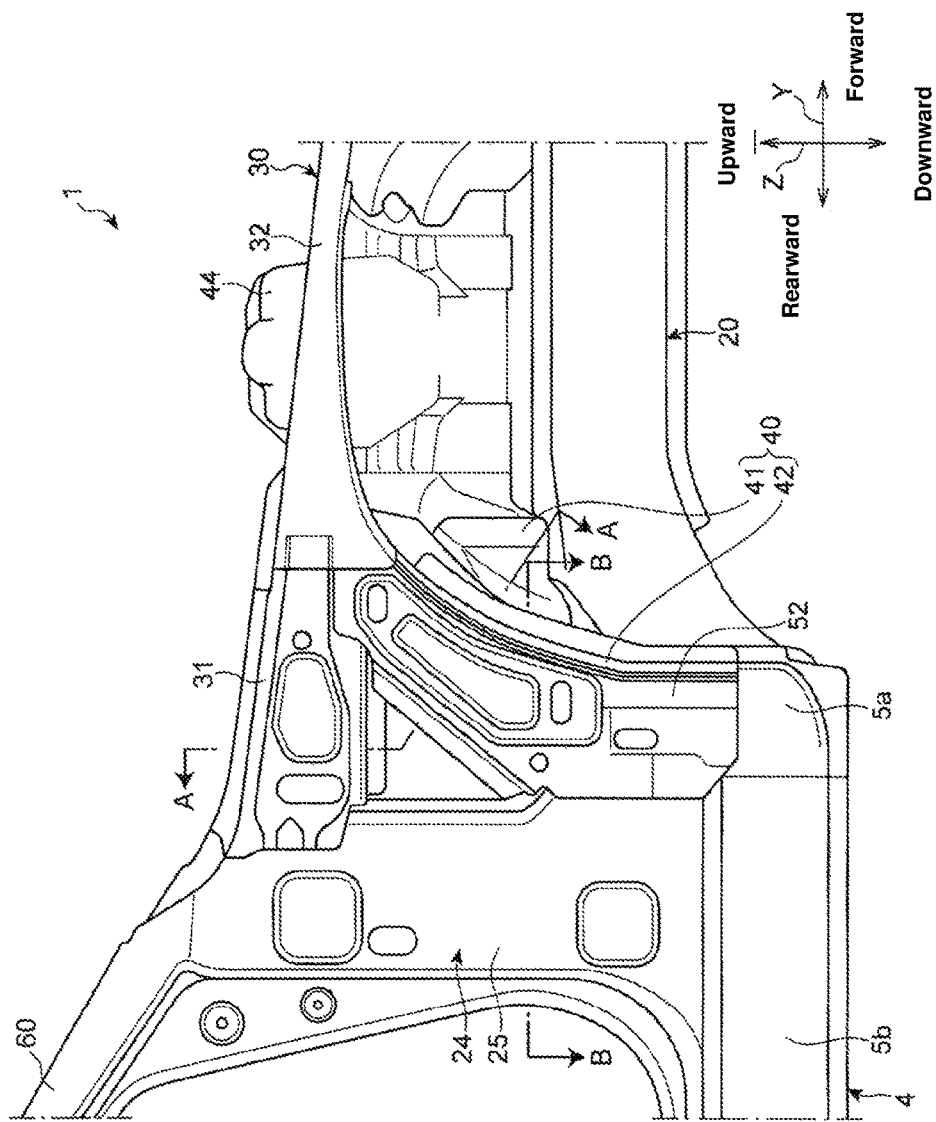
FIG. 2 is a side view of the vehicle-body portion shown in FIG. 1, when viewed from a rightward side.

As shown in FIGS. 1 and 2, the front side frame 20 is provided to extend in the vehicle longitudinal direction in front of the dash panel 10. The front side frame 20 is provided on the inward side, in the vehicle width direction, of the side sill 4 and on an upward side, in the vehicle vertical direction Z, of the side sill 4. A rear end portion of the front side frame 20 is connected to a front end portion of a side frame 23 which extends in the vehicle longitudinal direction Y along a lower face of the floor panel 2.

Figure 7:
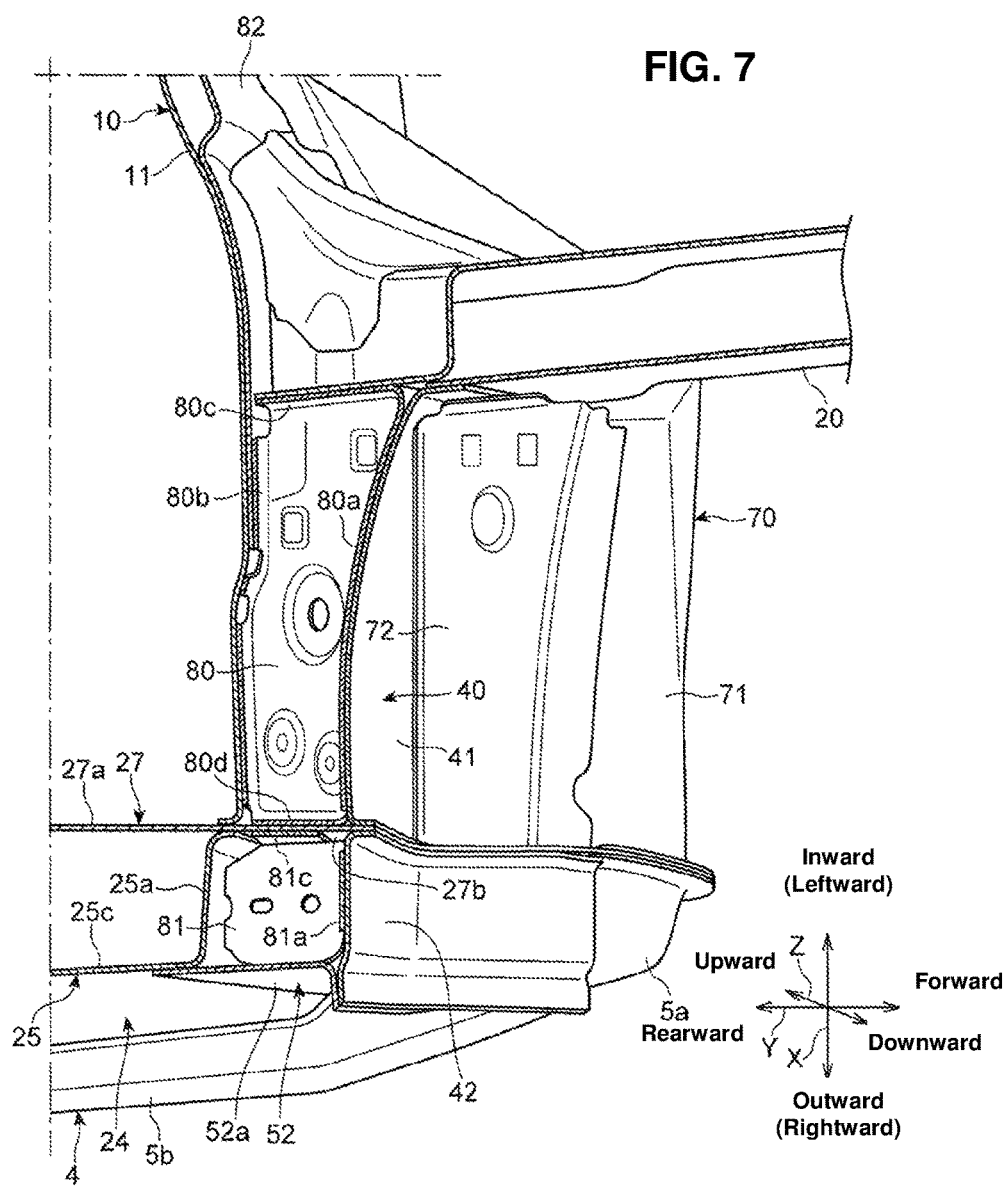
FIG. 7 is a partially-broken perspective view of the vehicle-body portion shown in FIG. 6, when viewed from an obliquely forward-and-upward side.
Figure 11:
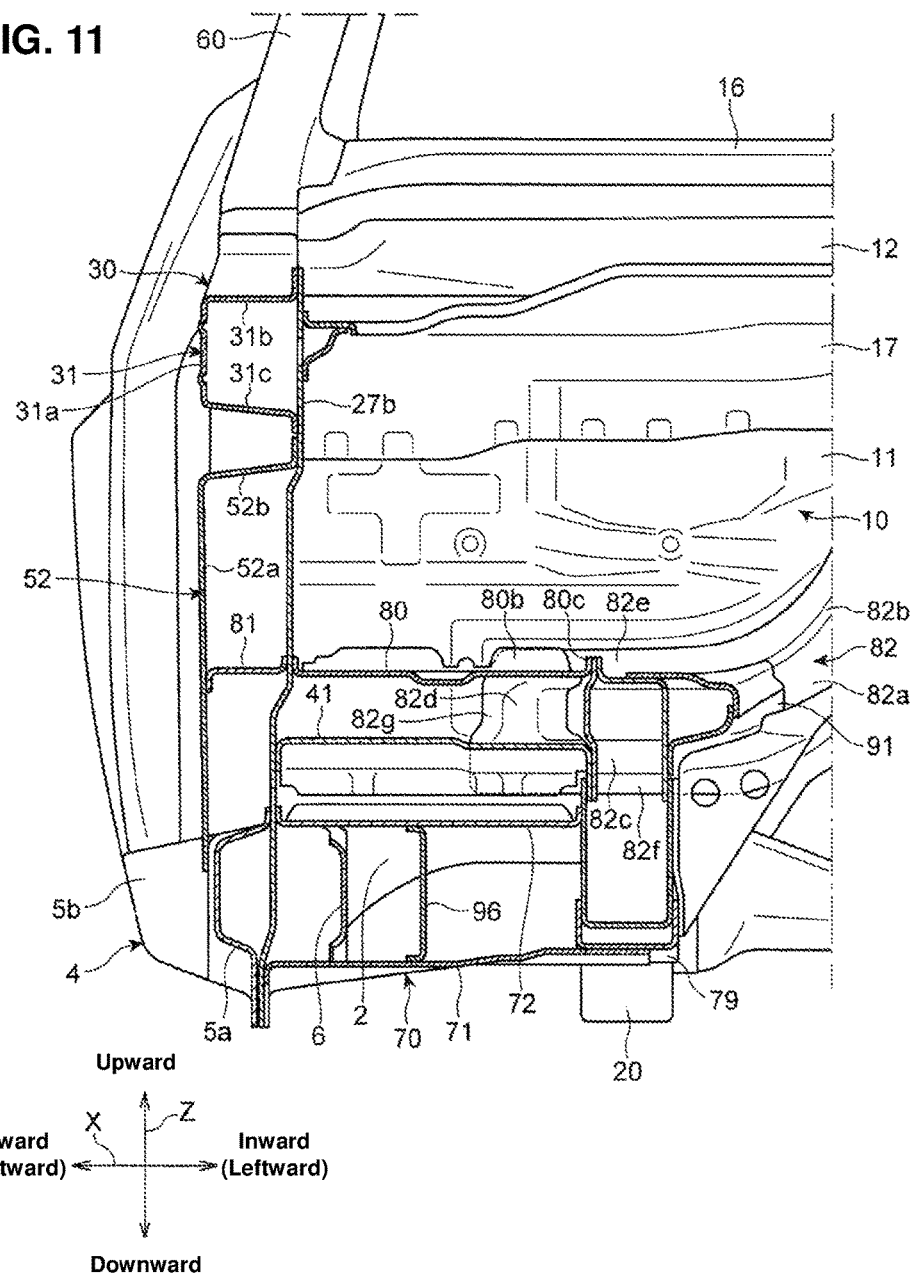
FIG. 11 is a sectional view taken along line C-C of FIG. 10, which shows the apron rear panel and its surrounding portion, when viewed from a forward side.

As shown in FIGS. 7 and 11, the rear end portion of the front side frame 20 is connected to a front end portion of the side sill 4 via a torque box 70. The torque box 70 comprises a torque box lower 71 which extends in the vehicle width direction X and has a groove shape opening upward and a torque box upper 72 which is provided above the torque box lower 71 and has a plate shape having a longer length in the vehicle width direction X.

The torque box lower 71 and the torque box upper 72 are joined to the front side frame 20 at respective inward end portions, in the vehicle width direction X, thereof, and also joined to the front side sill outer 5a at respective outward end portions, in the vehicle width direction X, thereof, having the cowl side panel 27b be interposed between them. Herein, a bracket 79 which is joined to a lower side of the front side frame 20 is interposed between the torque box lower 71 and the front side frame 20.

Figure 12:
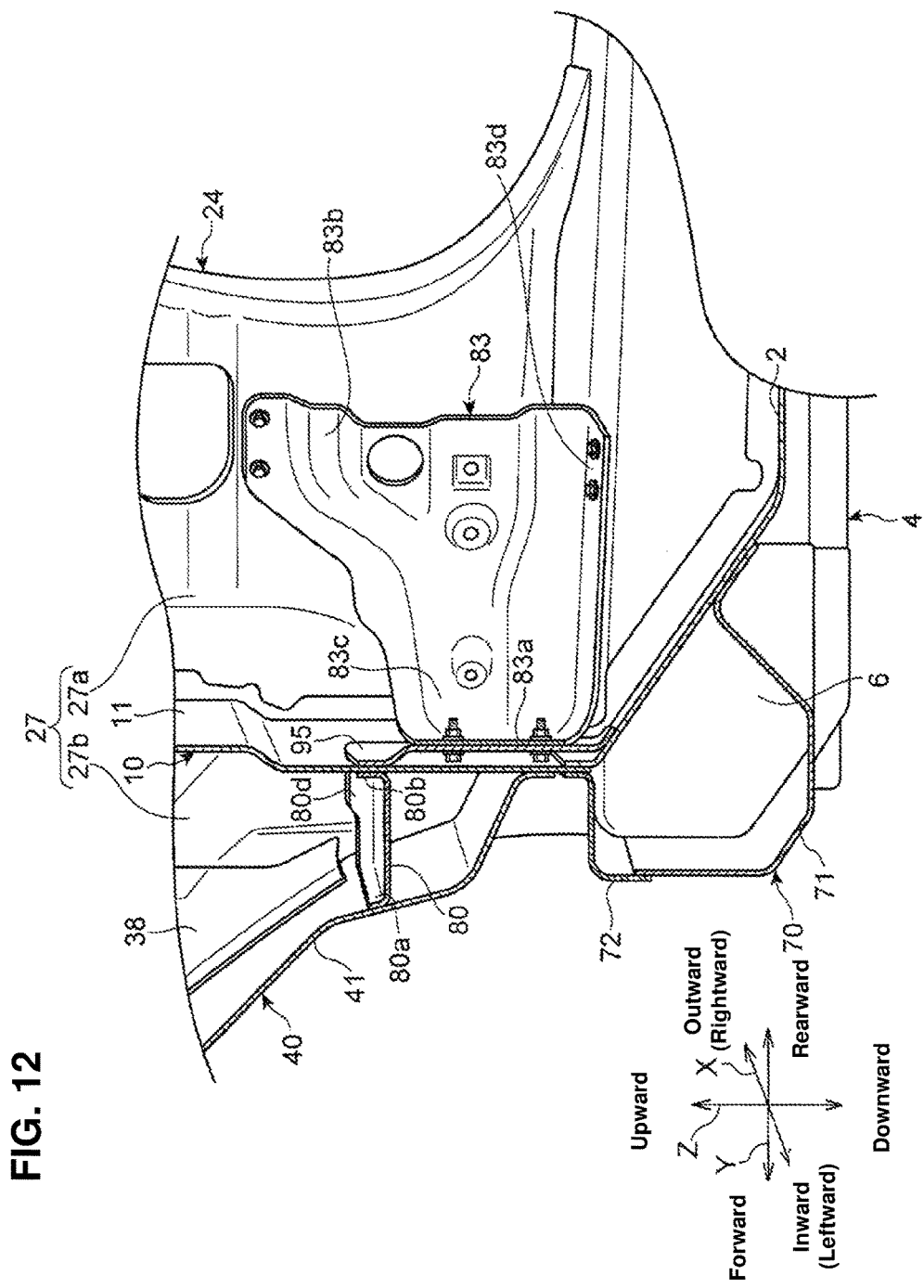
FIG. 12 is a sectional view taken along line D-D of FIG. 10, which shows a third reinforcing member and its surrounding portion, when viewed from the inward side in the vehicle width direction.

As shown in FIG. 12, the torque box lower 71 and the torque box upper 72 are joined to each other at respective forward end portions thereof. The torque box lower 71 is joined to the floor panel 2 at its rearward end portion, and the torque box upper 72 is joined to the dash panel lower 11 at its rearward end portion. A closed cross section which is continuous in the vehicle width direction X is formed among the torque box lower 71, the torque box upper 72, and the floor panel 2 on the inward side, the vehicle width direction X, of the side sill inner 6. In the present specification, this closed cross section will be referred to as "the closed cross section of the torque box 70."

As shown in FIG. 11, a plate-shaped partitioning member 96 which is provided roughly perpendicularly to the vehicle width direction X is arranged in the closed cross section of the torque box 70, whereby the rigidity of the torque box 70 is increased.

As shown in FIGS. 1 and 11, the apron reinforcement 30 is provided to extend in the vehicle longitudinal direction Y on the outward side, in the vehicle width direction X, of the front side frame 20. The apron reinforcement 30 comprises a rear apron reinforcement 31 which extends forward from an upper end portion of the hinge pillar 24 and a front apron reinforcement 32 which further extends forward from a front end portion of the rear apron reinforcement 31.

Figure 5:
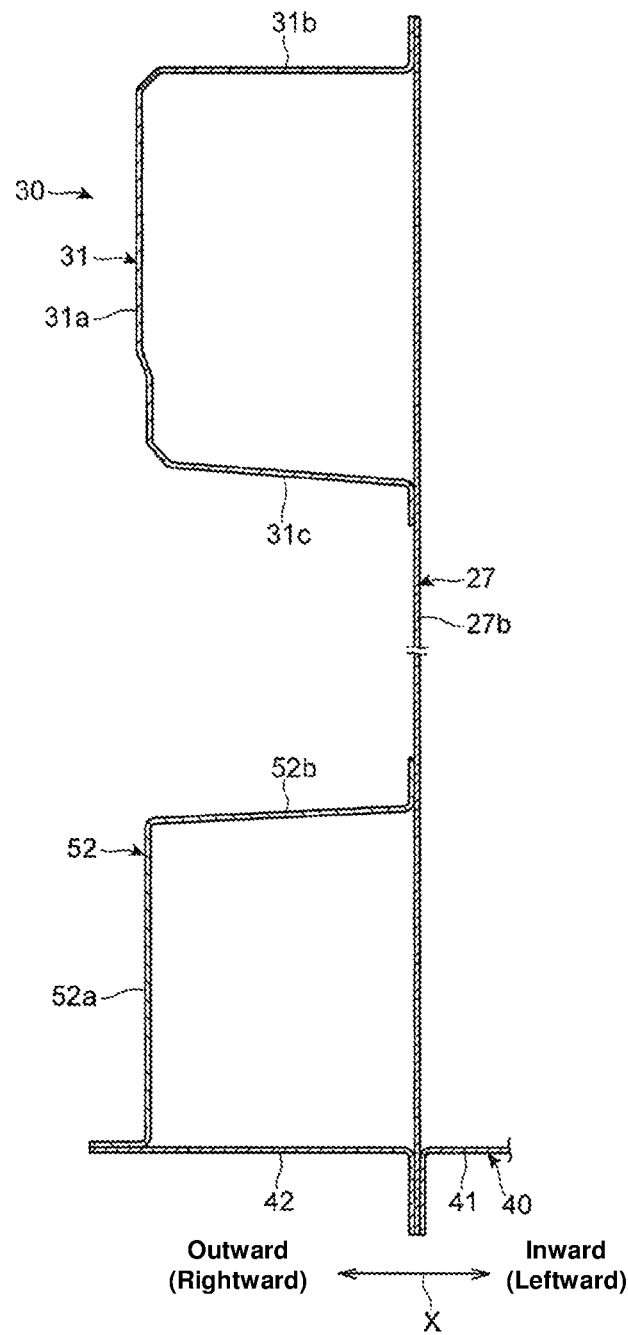
FIG. 5 is a sectional view taken along line A-A of FIG. 2, which shows sectional shapes of an apron reinforcement and a connecting member.

As shown in FIG. 5, the rear apron reinforcement 31 is formed in a hat shape, which includes a side face portion 31a which is provided to face an outward side, in the vehicle width direction X, of the cowl side panel 27b, being spaced apart from the cowl side panel 27b, an upper face portion 31b which extends inward, in the vehicle width direction X, from an upper edge portion of the side face portion 31a, and a lower face portion 31c which extends inward, in the vehicle width direction X, from a lower edge portion of the side face portion 31a. Respective inward ends, in the vehicle width direction X, of the upper face portion 31b and the lower face portion 31c are joined to the cowl side panel 27b, whereby a closed cross section which is continuous in a vehicle longitudinal direction Y is formed between the cowl side panel 27b and the rear apron reinforcement 31. In the present specification, this closed cross section will be referred to as "the closed cross section of the apron reinforcement 30." Herein, the rear apron reinforcement 31 and the front apron reinforcement 32 may be formed integrally.

Figure 4:
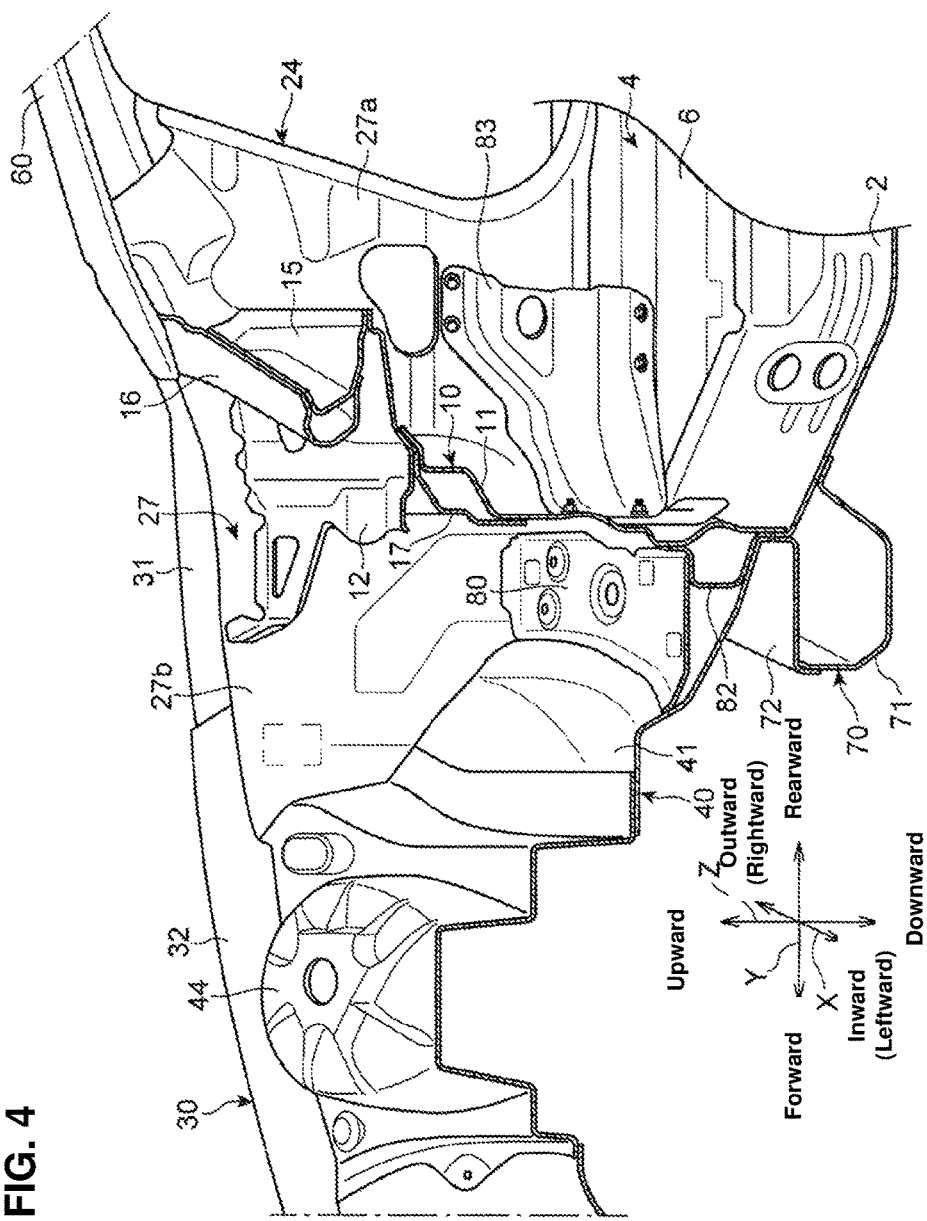
FIG. 4 is a partially-broken perspective view of a right-side portion of a front portion of a vehicle body, when viewed from an obliquely inward-and-upward side.

As shown in FIGS. 1 and 4, the wheel house 40 is provided in front of the dash panel 10, which accommodates a front wheel (not illustrated). As shown in FIG. 5, the wheel house 40 comprises a wheel house inner 41 which is provided on the inward side, in the vehicle width direction X, of the cowl side panel 27b and a wheel house outer 42 which is provided on the outward side, in the vehicle width direction X, of the cowl side panel 27b. The wheel house inner 41 and the wheel house outer 42 are joined to each other via the cowl side panel 27b.

Further, as shown in FIGS. 1 and 4, the wheel house 40 comprises a suspension housing 44 which accommodates a front-wheel suspension member (not illustrated). While the suspension housing 44 is joined to the wheel house inner 41, it may be formed integrally with the wheel house inner 41. The suspension housing 44 is attached between the front side frame 20 and the front apron reinforcement 32.

The wheel house inner 41 is joined to the dash panel lower 11 at its rear end portion (see FIG. 12), joined to the front side frame 20 at an inward end portion, in the vehicle width direction, thereof, and joined to the cowl side panel 27b at an outward end portion, in the vehicle width direction X, thereof.

As shown in FIG. 5, the wheel house outer 42 is joined to the cowl side panel 27b at an inward end portion, in the vehicle width direction X, thereof, and joined to a connecting member 52, which will be described later, at an outward end portion, in the vehicle width direction X, thereof.

As shown in FIG. 2, the connecting member 52 is provided below the rear apron reinforcement 31, and connects the apron reinforcement 30 and the hinge pillar 24 in a brace shape. The connecting member 52 extends from a lower end portion of the hinge pillar 24 in a slant direction such that the connecting member 52 slants upward and forward.

As shown in FIG. 5, the connecting member 52 comprises a side face portion 52a which faces an outward side, in the vehicle width direction X, of the cowl side panel 27b, being spaced apart from that, and a rear face portion 52b which extends inward, in the vehicle width direction X, from a rear edge portion of the side face portion 52a, which is a member having an L-shaped cross section. To a front edge portion of the side face portion 52a is joined an outward end portion, in the vehicle width direction X, of the wheel house outer 42. An inward end portion, in the vehicle width direction X, of the rear face portion 52b is joined to the cowl side panel 27b.

As shown in FIG. 2, an upper end portion of the side face portion 52a of the connecting member 52 is joined to a front end portion of the rear apron reinforcement 31. The side face portion 52a is provided to extend downward below a lower end of the rear face portion 52b, and a lower end portion of the side face portion 52a is joined to the front side sill outer 5a.

Figure 3:
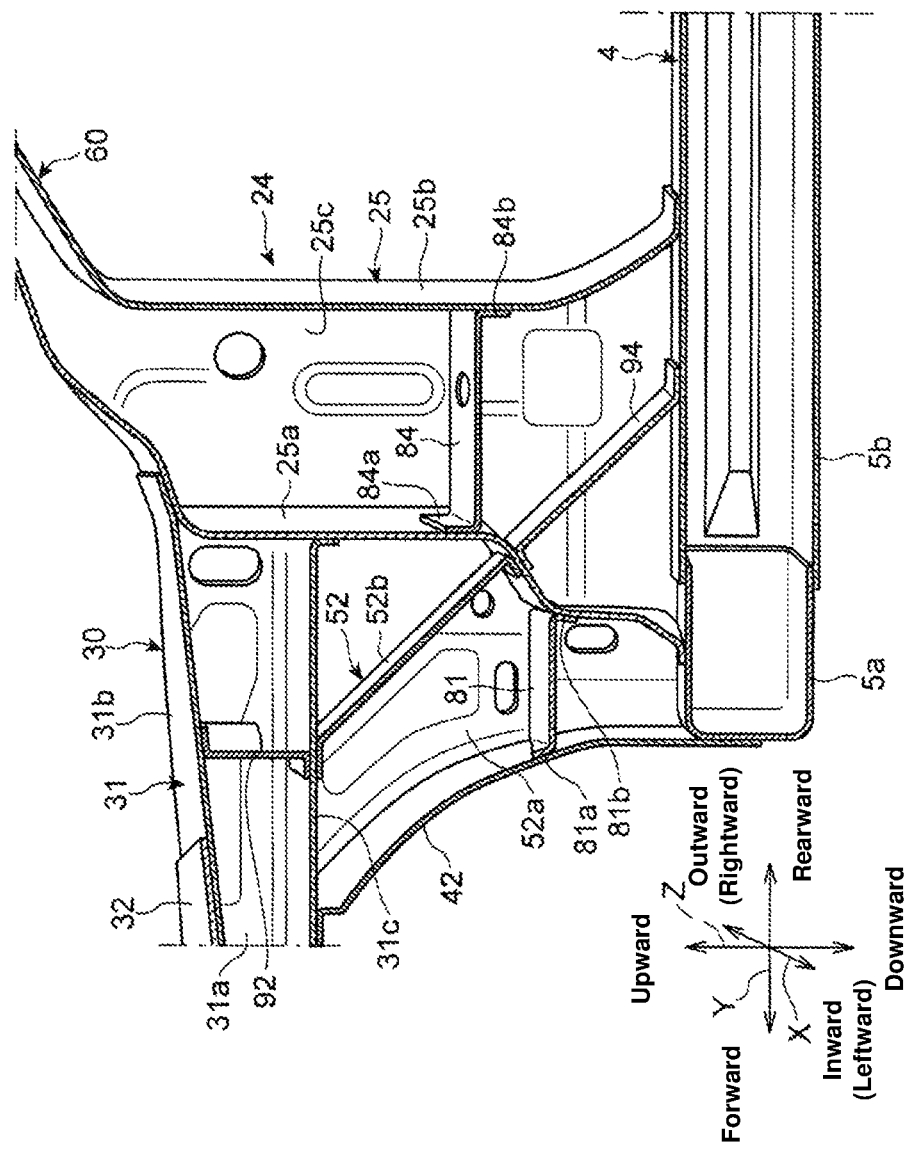
FIG. 3 is a sectional view of an internal structure of a hinge pillar and its surrounding portion, when viewed from an inward side in a vehicle width direction.

As shown in FIG. 3, the rear face portion 52b of the connecting member 52 is joined to the rear apron reinforcement 31 at its upper end portion, and joined to the hinge pillar outer 25 at its lower end portion.

A plate-shaped partitioning member 92 is provided in the closed cross section of the apron reinforcement 30 at a position, in the vehicle longitudinal direction Y, where a joint portion of the rear face portion 52b of the connecting member 52 and the lower face portion 31c of the rear apron reinforcement 31 is located. The partitioning member 92 is arranged roughly perpendicularly to the vehicle longitudinal direction Y, and joined to the side face portion 31a, the upper face portion 31b, and the lower face portion 31c of the rear apron reinforcement 31 and the cowl side panel 27b.

A plate-shaped reinforcing member 94 is arranged in the closed cross section of the hinge pillar 24 at a position which is located obliquely rearward and downward relative to the rear face portion 52b of the connecting member 52. The reinforcing member 94 is provided to extend obliquely forward and upward from the upper face of the rear side sill outer 5b to the front face portion 25a of the hinge pillar outer 25. The reinforcing member 94 is provided substantially coaxially with the rear face portion 52b of the connecting member 52, when viewed from the inward side in the vehicle width direction X.

A closed cross section is formed among the side face portion 52a and the rear face portion 52b of the connecting member 52, the cowl side panel 27b, and the wheel house outer 42 in a level range, in the vehicle vertical direction Z, which corresponds to the level of the rear face portion 52b of the connecting member 52. Further, a closed cross section is formed among the side face portion 52a of the connecting member 52, the cowl side panel 27b, the wheel house outer 42, and the front face portion 25a of the hinge pillar outer 25 in a level range, in the vehicle vertical direction Z, which is located below the rear face portion 52b of the connecting member 52 and corresponds to the level of the side face portion 52a of the connecting member 52. These closed cross sections are continuous from each other in a longitudinal direction of the connecting member 52. Hereafter, these closed cross sections will be referred to as the "the closed cross sections of the connecting member 52."

Figure 10:
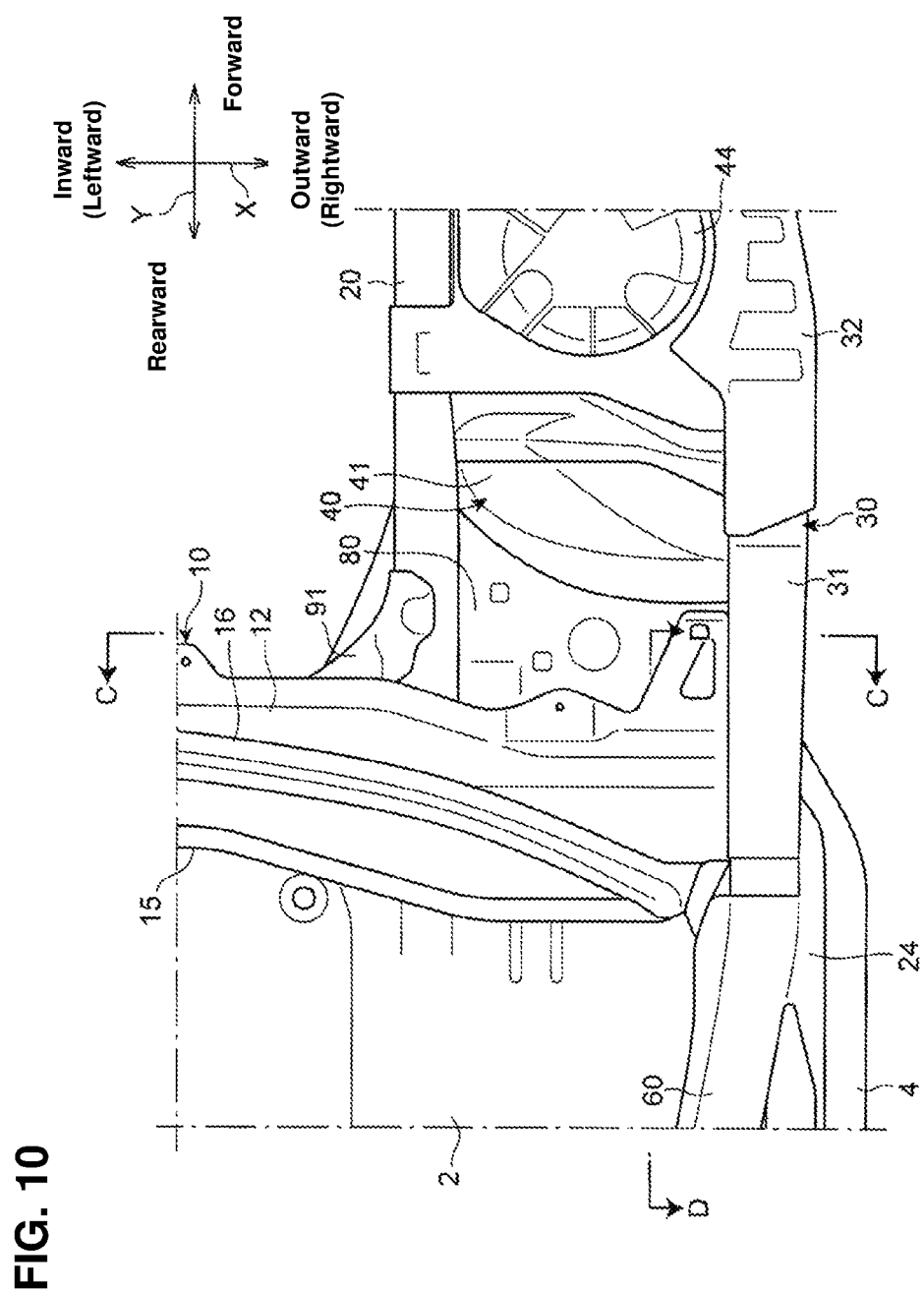
FIG. 10 is a plan view showing the apron rear panel and its surrounding portion.

As shown in FIGS. 1, 4 and 10, an apron rear panel 80 is provided between a rear portion of the wheel house 40 and the dash panel 10. Specifically, as shown in FIGS. 6 and 7, the apron rear panel 80 is provided to extend between the wheel house inner 41 and the dash panel lower 11, and to connect these mutually. Further, the apron rear panel 80 is provided to extend between the cowl side panel 27b and the front side frame 20, and connect these mutually.

Figure 8:
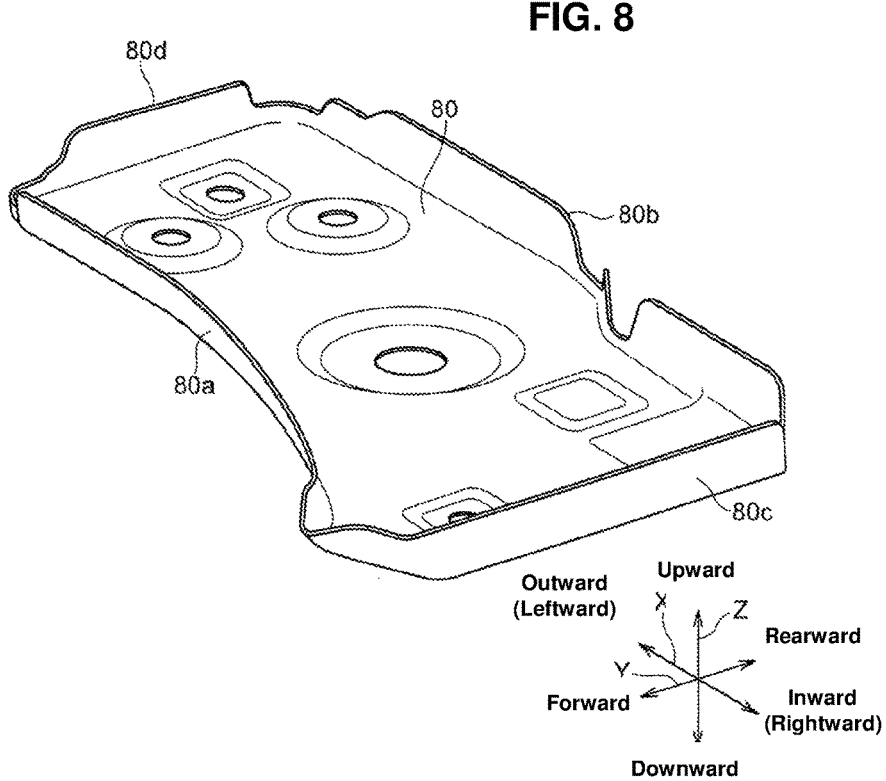
FIG. 8 is a perspective view showing the apron rear panel.

As shown in FIG. 8, the apron rear panel 80 is a square-shaped plate member which has its longer length in the vehicle width direction X is provided roughly perpendicularly to the vehicle vertical direction Z. A forward flange portion 80a, a rearward flange portion 80b, an inward flange portion 80c, and an outward flange portion 80d are provided to rise upward at a forward edge portion, a rearward edge portion, an inward edge portion, and an outward edge portion of the apron rear panel 80, respectively.

As shown in FIG. 7, the forward flange portion 80a of the apron rear panel 80 is joined to the wheel house inner 41, the rearward flange portion 80b is joined to the dash panel lower 11, the inward flange portion 80c is joined to the front side frame 20, and the outward flange portion 80d is joined to the cowl side panel 27b.

As shown in FIGS. 6 and 7, the apron rear panel 80 is arranged closely to an inward side, in the vehicle width direction, of the connecting member 52, having the cowl side panel 27b be interposed between the apron rear panel 80 and the connecting member 52. A first reinforcing member 81 is provided in the closed cross section of the connecting member 52 at a position located closely to an outward side, in the vehicle width direction X, of the apron rear panel 80.

The first reinforcing member 81 is a plate-shaped partitioning member which is provided roughly perpendicularly to the vehicle vertical direction Z. The first reinforcing member 81 partitions an internal space which is formed among the connecting member 52, the cowl side panel 27b, the wheel house outer 42, and the hinge pillar outer 25 in the vehicle vertical direction Z. Thus, since the first reinforcing member 81 is arranged in the closed cross section of the connecting member 52, the rigidity of the connecting member 52 is increased.

Figure 9:
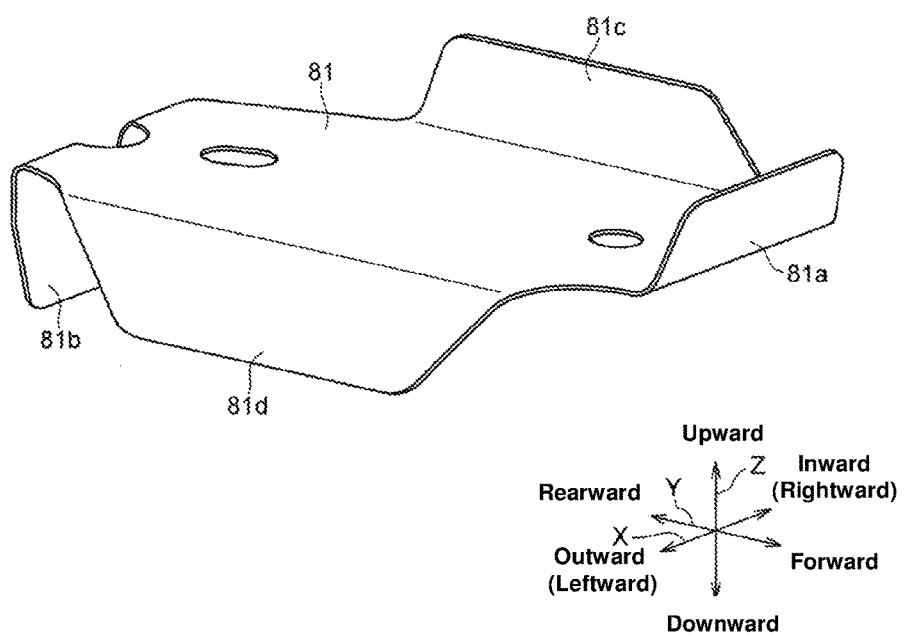
FIG. 9 is a perspective view showing a first reinforcing member.

As shown in FIG. 9, a forward flange portion 81a to be joined to the wheel house outer 42 is provided at a front edge portion of the first reinforcing member 81 such that it extends upward, and a rearward flange portion 81b to be joined to the front face portion 25a of the hinge pillar outer 25 is provided at a rear edge portion of the first reinforcing member 81 such that it extends downward. An inward flange portion 81c to be joined to the cowl side panel 27b is provided at an inward edge portion, in the vehicle width direction X, of the first reinforcing member 81 such that it extends upward, and an outward flange portion 81d to be joined to the side face portion 52a of the connecting member 52 is provided at an inward edge portion, in the vehicle width direction X, of the first reinforcing member 81 such that it extends upward.

As shown in FIG. 11, the apron rear panel 80 is arranged closely to the inward side, in the vehicle width direction X, of the first reinforcing member 81, having the cowl side panel 27b be interposed between the apron rear panel 80 and the first reinforcing member 81, and arranged substantially at the same level as the first reinforcing member 81 in the vehicle vertical direction Z.

Herein, while the apron rear panel 80 and the first reinforcing member 81 may not be arranged at the perfectly same level, it is preferable that these be provided to overlap each other in the vehicle vertical direction Z. In particular, it is preferable that the apron rear panel 80 and the first reinforcing member 81 be provided to overlap each other in the vehicle vertical direction Z at a joint portion thereof to the cowl side panel 27b.

Thereby, when an impact load to cause the front wheel to retreat relative to the vehicle body is inputted from the forward side of the vehicle body, part of the load inputted from the front wheel to the connecting member 25 by way of the wheel house outer 42 is effectively dispersed to the apron rear panel 80 from the first reinforcing member 81 by way of the cowl side panel 27b. The load transmitted to the apron rear panel 80 is further dispersed to various parts of the vehicle body by way of the dash panel lower 11, the front side frame 20, and others.

As shown in FIGS. 1, 4, 7 and 11, a second reinforcing member 82 which extends in the vehicle width direction X is joined to the front face of the dash panel lower 11. As shown in FIG. 1, the second reinforcing member 82 is curved such that a longitudinally-central portion thereof protrudes obliquely rearward and upward along a shape of a floor tunnel. As shown in FIG. 4, the second reinforcing member 82 is a member which has a hat-shaped cross section opening rearward, and it forms a closed cross section continuous in the vehicle width direction X together with the dash panel lower 11. In the present specification, this closed cross section will be referred to as "the closed cross section of the second reinforcing member 82."

As shown in FIG. 11, the second reinforcing member 82 comprises a front face portion 82a which faces a forward side of the dash panel lower 11, being spaced apart from that, an upper face portion 82b which extends rearward from an upper edge portion of the front face portion 82a toward the dash panel lower 11, a lower face portion 82c which extends rearward from a lower edge portion of the front face portion 82a toward the dash panel lower 11, a side face portion 82d which extends rearward from an end portion, in a longitudinal direction, of the front face portion 82a toward the dash panel lower 11, an upward flange portion 82e which extends upward from a rearward end portion of the upper face portion 82b and is joined to the dash panel lower 11, a downward flange portion 82f which extends downward from a rearward end portion of the lower face portion 82b and is joined to the dash panel lower 11, and a side flange portion 82g which extends outward, in the vehicle width direction X, from a rearward end portion of the side face portion 82d and is joined to the dash panel lower 11.

The second reinforcing member 82 is connected to a rear end portion of the front side frame 20 via a root reinforcement 91. The root reinforcement 91 is attached between an inward side, in the vehicle width direction, of an upper portion of the rear end portion of the front side frame 20 and a front-face side of the second reinforcing member 82.

The second reinforcing member 82 is provided to overlap the wheel house inner 41 when viewed from the forward side of the vehicle. The downward flange portion 82f of the second reinforcing member 82 is interposed between a rear end portion of the wheel house inner 41 and the dash panel lower 11. Thereby, when the impact load is inputted from the front wheel which has retreated relative to the vehicle body to the wheel house inner 41, this load is effectively dispersed from the wheel house inner 41 to the second reinforcing member 82.

Further, the second reinforcing member 82 is provided to overlap the apron rear panel 80 when viewed from the forward side of the vehicle. Specifically, the upward flange portion 82e of the second reinforcing member 82 overlaps the rearward flange portion 80b of the apron rear panel 80 when viewed from the forward side of the vehicle, and in this overlap area, the rearward flange portion 80b of the apron rear panel 80 is directly joined to upward flange portion 82e of the second reinforcing member 82 and also indirectly joined to the dash panel lower 11 via the upward flange portion 82e.

Accordingly, the load dispersed from the front wheel relatively having retreated to the apron rear panel 80 by way of the wheel house outer 42, the connecting member 52, the first reinforcing member 81, and the cowl side panel 27b is effectively dispersed to the second reinforcing member 82. Thus, the load inputted to the end portion, in the longitudinal direction, of the second reinforcing member 82 from the apron rear panel 80 is dispersed to the dash panel lower 11 and transmitted inward in the vehicle width direction X along the second reinforcing member 82 and then dispersed rearward from the longitudinally-central portion of the second reinforcing member 82 by way of the floor tunnel.

As shown in FIGS. 6 and 12, a third reinforcing member 83 is provided in back of the dash panel lower 11 in the brace shape between the dash panel lower 11 and the hinge pillar inner 27a. The third reinforcing member 83 is a plate-shaped member which includes a front face portion 83a which faces the rearward side of the dahs panel lower 11, a side face portion 83b which faces an inward side, in the vehicle width direction X, of the hinge pillar inner 27a, and a curve portion 83c which integrally connects the front face portion 83a and the side face portion 83b.

The front face portion 83a of the third reinforcing member 83 is joined to the dash panel lower 11 via a bracket 95, for example. The bracket 95 is provided between the vicinity of a font end of the floor panel 2 and the dash panel lower 11, and joined to the dash panel lower 11 and the floor panel 2 by welding, for example. An upper end portion of the bracket 95 is provided to overlap a rearward side of the rearward flange portion 80b of the apron rear panel 80, having the dash panel lower 11 be interposed between them. The front face portion 83a of the third reinforcing member 83 is provided below the apron rear panel 80 in the vehicle vertical direction Z, and joined to the bracket 95 by bolts, for example.

The side face portion 83b of the third reinforcing member 83 has a larger size than the front face portion 83a in the vehicle vertical direction Z, a lower end portion of the side face portion 83b is positioned below the apron rear panel 80, and an upper end portion of the side face portion 83b is positioned above the apron rear panel 80. The upper end portion of the side face portion 83b is joined to the hinge pillar inner 27a by bolts, for example.

The third reinforcing member 83 further includes a flange portion 83d which extends inward, in the vehicle width direction X, from lower ends of the side face portion 83b and the curve portion 83c, and this flange portion 83d is joined to an upper face of the side sill inner 6 by bolts, for example.

The third reinforcing member 83 is provided to overlap the apron rear panel 80 in the vehicle width direction X as shown in FIG. 6, and also to overlap the apron rear panel 80 in the vehicle vertical direction Z as shown in FIG. 12. That is, the apron rear panel 80 is provided to overlap the third reinforcing member 83 when viewed from the forward side of the vehicle.

Accordingly, the load dispersed from the front wheel relatively having retreated to the apron rear panel 80 by way of the wheel house outer 42, the connecting member 52, the first reinforcing member 81, and the cowl side panel 27b is effectively dispersed to the third reinforcing member 83 by way of the dash panel lower 11, and further effectively dispersed to the hinge pillar 24 and the side sill 4 from the third reinforcing member 83.

As shown in FIG. 3, a fourth reinforcing member 84 is provided in the closed cross section of the hinge pillar 24 at a positon located closely to and in back of a joint portion of the front face portion 25a of the hinge pillar outer 25 and the rear face portion 52b of the connecting member 52. The fourth reinforcing member 84 is a partitioning member which is provided roughly perpendicularly to the vehicle vertical direction Z, which partitions the inner space of the hinge pillar 24 into upper and lower parts.

The fourth reinforcing member 84 comprises a forward flange portion 84a which extends upward from a front edge portion thereof and a rearward flange portion 84b which extends downward from a rear edge portion thereof, and this member 84 is joined to the front face portion 25a of the hinge pillar outer 25 at the forward flange portion 84a and also joined to the rear face portion 25b of the hinge pillar outer 25 at the rearward flange portion 84a. The forward flange portion 84a is joined to the vicinity of a joint portion of the front face portion 25a of the hinge pillar outer 25 to the rear face portion 52b of the connecting member 52.

The rigidity of the load input portion of the hinge pillar 24 to which the load is inputted from the connecting member 52 is increased effectively by the fourth reinforcing member 84 provided in the closed cross section of the hinge pillar 24 as described above. Accordingly, the impact load inputted from the front wheel having retreated relatively to the high-rigidity portion of the hinge pillar 24 by way of the connecting member 52 can be effectively dispersed from the hinge pillar 24 to the various parts of the vehicle body by way of the side sill 4, the front pillar 60, and the others.

Further, since the impact load inputted to the front face portion 25a of the hinge pillar outer 25 from the rear face portion 52b of the connecting member 52 can be effectively dispersed to the rear face portion 25b of the hinge pillar outer 25 by way of the fourth reinforcing member 84, the effective load dispersion to the vehicle rearward side can be attained.

As described above, according to the first embodiment, when the impact load causing the front wheel to retreat relative to the vehicle body is inputted from the forward side of the vehicle, the impact load inputted from the front wheel to the connecting member 52 is effectively dispersed to the various parts of the vehicle body by way of the apron rear panel 80 and the hinge pillar 24, so that the deformation of the cabin can be suppressed effectively.

Embodiment 2

A front vehicle-body structure of a vehicle according to a second embodiment will be described referring to FIGS. 13-16. In the second embodiment, the same structural elements as the first embodiment are denoted by the same reference characters, descriptions of which are omitted.

Figure 16:
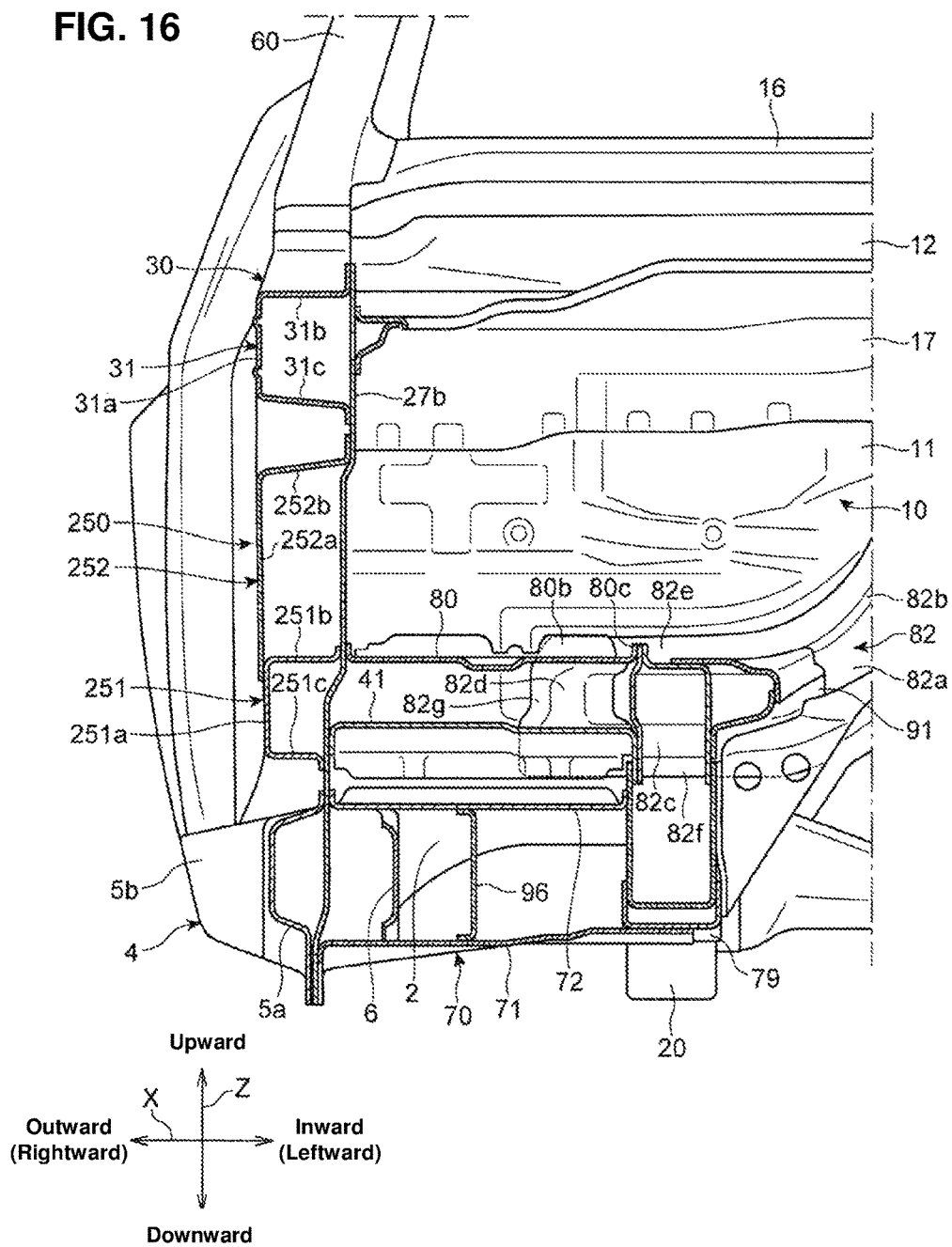
FIG. 16 is a sectional view showing an apron rear panel and its surrounding portion according to the second embodiment, when viewed from the forward side, which is similar to FIG. 11.

A automotive vehicle 201 provided with the front vehicle-body structure according to the second embodiment comprises the floor panel 2, the pair of right-and-left side sills 4, the dash panel 10, the pair of right-and-left side inner panels 27, the pair of right-and-left hinge pillars 24, the pair of right-and-left front side frames 20, the pair of right-and-left apron reinforcements 30, the pair of right-and-left wheel houses 40, and the apron rear panel 80, which are similar to the first embodiment (see FIG. 16).

Figure 13:
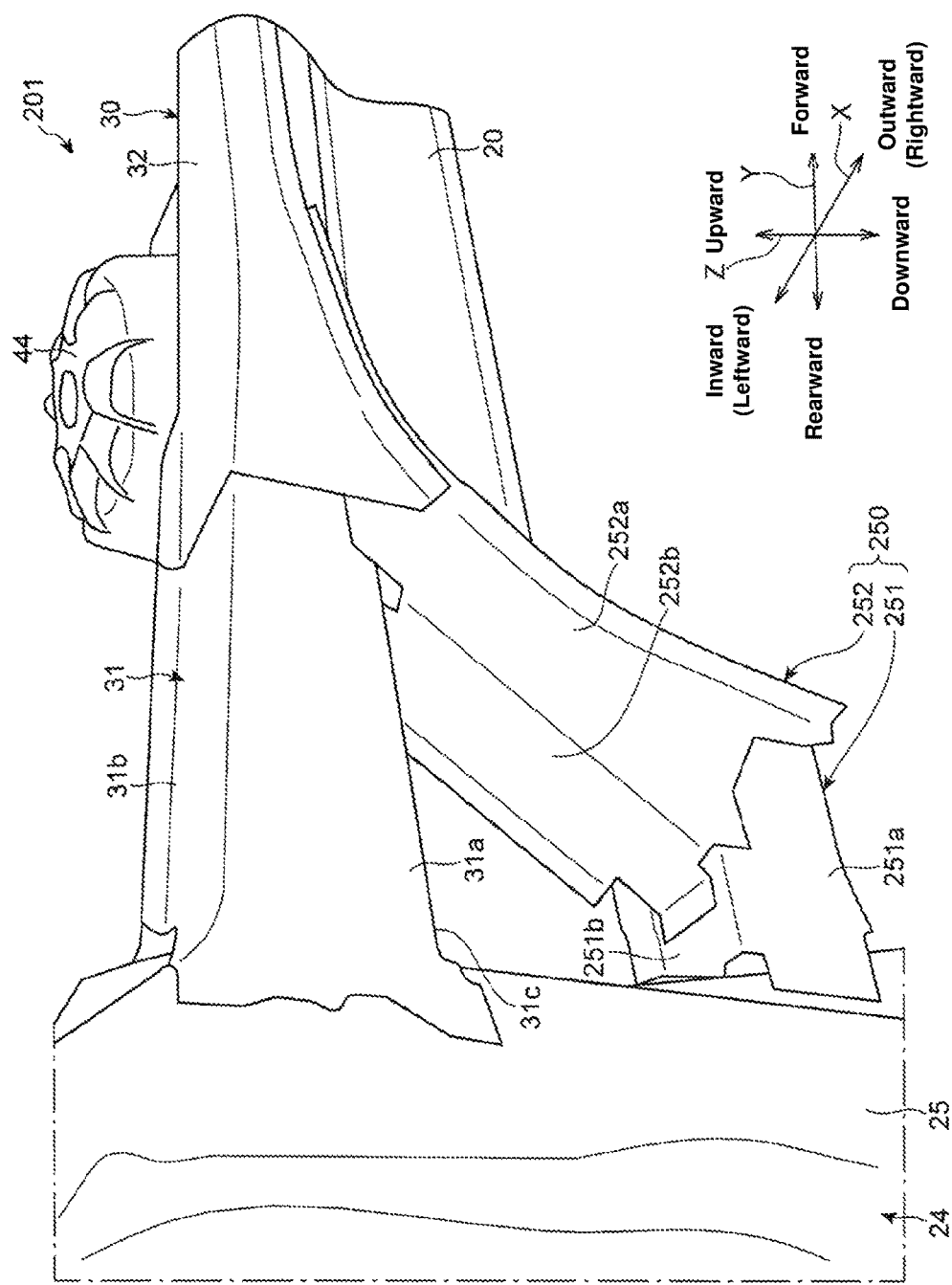
FIG. 13 is a perspective view showing a front vehicle-body structure of a vehicle according to a second embodiment of the present invention.

As shown in FIG. 13, while the apron reinforcement 30 and the hinge pillar 24 are, similarly to the first embodiment, connected by a connecting member 250 in the brace shape, the structure of the connecting member 250 is different from the first embodiment.

The connecting member 250 of the second embodiment comprises a first connecting member 251 which extends forward from a portion of the hinge pillar 24 which is positioned below the apron reinforcement 30 and a second connecting member 252 which interconnects a front end portion of the first connecting member 251 and the apron reinforcement 30.

Figure 14:
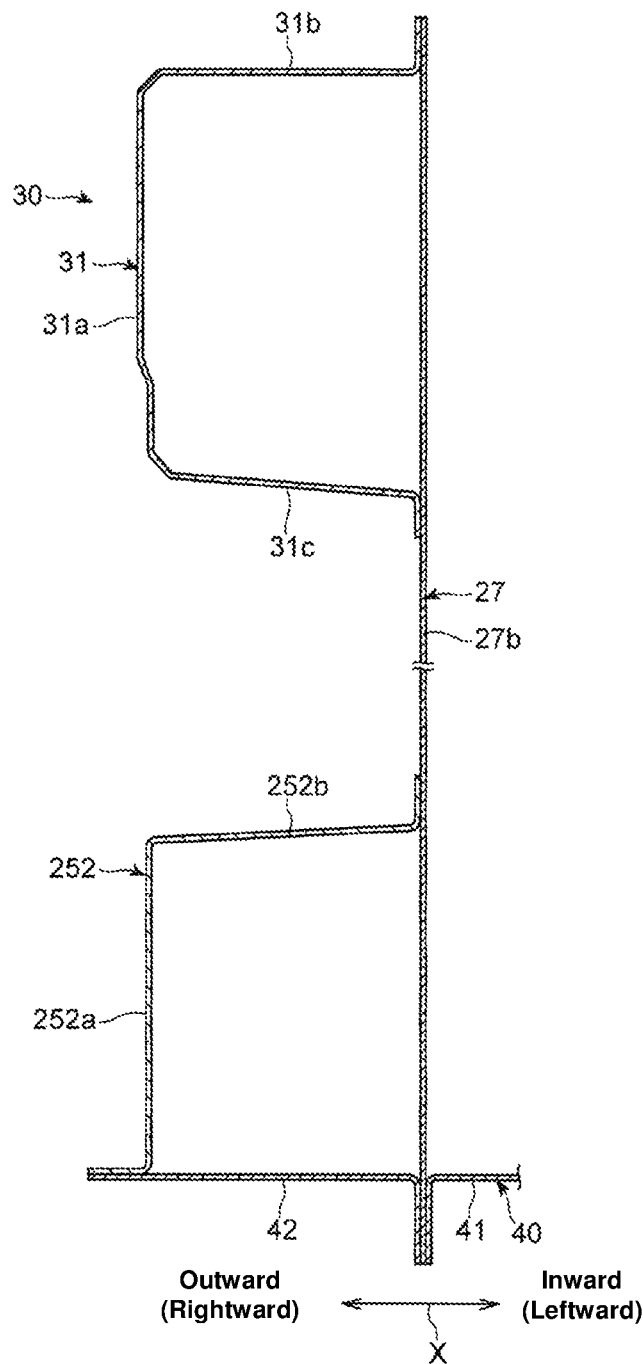
FIG. 14 is a sectional view showing an apron reinforcement and a second connecting member according to the second embodiment, which is similar to FIG. 5.

FIG. 14 is a sectional view showing respective cross section shapes of the rear apron reinforcement 31 and the second connecting member 252, which is similar to FIG. 5. As shown in FIG. 14, the second connecting member 252 comprises, similarly to the connecting member 52 of the first embodiment, a side face portion 252a which faces the outward side, in the vehicle width direction X, of the cowl side panel 27b, being spaced apart from that, and a rear face portion 252b which extends inward, in the vehicle width direction X, from a rear edge portion of the side face portion 252a, which is a member having an L-shaped cross section.

A front edge portion of the side face portion 252a of the second connecting member 252 is joined to the outward end portion, in the vehicle width direction X, of the wheel house outer 42, and an inward end portion, in the vehicle width direction X, of the rear face portion 252b of the second connecting member 252 is joined to the cowl side panel 27b. Thereby, the second connecting member 252 forms a closed cross section between the cowl side panel 27b and the wheel house outer 42. In the present specification, this closed cross section will be referred to as "the closed cross section of the second connecting member 252."

Further, as shown in FIG. 13, the second connecting member 252 is provided to extend obliquely forward and upward from the front end portion of the first connecting member 251. An upper end portion of the side face portion 252a of the second connecting member 252 is joined to the side face portion 31a of the rear apron reinforcement 31, and an upper end portion of the rear face portion 252b of the second connecting member 252 is joined to the lower face portion 31c of the rear apron reinforcement 31.

Figure 15:
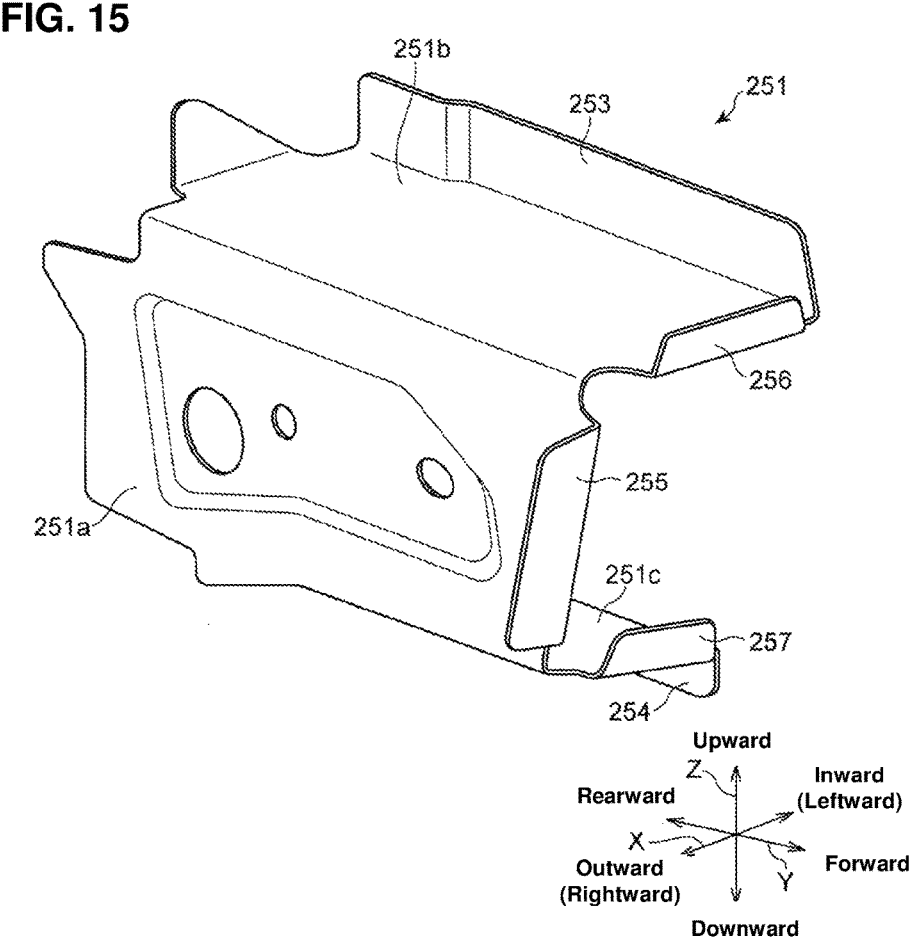
FIG. 15 is a perspective view showing a first connecting member.

As shown in FIG. 15, the first connecting member 251 is a member which is configured to have a hat-shaped cross section opening inward, in the vehicle width direction X, as a whole, and provided to extend in the vehicle longitudinal direction Y. The first connecting member 251 comprises a side face portion 251a which faces the outward side, in the vehicle width direction X, of the cowl side panel 27b, being spaced apart from that, an upper face portion 251b which extends inward, in the vehicle width direction X, from an upper edge portion of the side face portion 251a, and a lower face portion 251c which extends inward, in the vehicle width direction X, from a lower edge portion of the side face portion 251a. The side face portion 251a, the upper face portion 251b, and the lower face portion 251c of the first connecting member 251 are joined to the hinge pillar outer 25 at their respective rear end portions.

Further, the upper face portion 251b of the first connecting member 251 includes an upward flange portion 253 which extends upward from an inward edge portion, in the vehicle width direction, thereof, and is joined to the cowl side panel 27b at the upward flange portion 253. A lower face portion 251c of the first connecting member 251 includes a downward flange portion 254 which extends downward from an inward edge portion, in the vehicle width direction X, thereof, and is joined to the cowl side panel 27b at the downward flange portion 254. Thereby, a closed cross section is formed by the first connecting member 251 and the cowl side panel 27b. In the present specification, this closed cross section will be referred to as "the closed cross section of the first connecting member 251."

Moreover, at the front end portion of the first connecting member 251 are provided a first flange portion 255 which extends outward, in the vehicle width direction X, from a front edge portion of the side face portion 251a, a second flange portion 256 which extends upward from a front edge portion of the upper face portion 25b, and a third flange portion 257 which extends upward from a front edge portion of the lower face portion 251c, and the first connecting member 251 is joined to a rear end portion of the wheel house outer 42 (see FIG. 14) at the first, second and third flange portions 255, 256, 257.

As shown in FIG. 16, the upper face portion 251b of the first connecting member 251 is provided to be roughly horizontal and close to an outward side, in the vehicle width direction X, of the apron rear panel 80, having the cowl side panel 27b be interposed between them. The apron rear panel 80 and the upper face portion 251b of the first connecting member 251 are provided substantially at the same level in the vehicle vertical direction Z.

Herein, while the apron rear panel 80 and the upper face portion 251b of the first connecting member 251 may not be provided at the same level completely, it is preferable that these be arranged so as to overlap each other in the vehicle vertical direction Z. Particularly, it is preferable that the apron rear panel 80 and the upper face portion 251b of the first connecting member 251 be provided to overlap each other in the vehicle vertical direction Z at a joint portion thereof to the cowl side panel 27b.

Thereby, when the impact load to cause the front wheel to retreat relative to the vehicle body is inputted from the forward side of the vehicle, part of the load inputted to the connecting member 250 from the wheel by way of the wheel house outer 42 is effectively dispersed from the upper face portion 251b of the first connecting member 251 to the apron rear panel 80 by way of the cowl side panel 27b. Accordingly, similarly to the first embodiment, the load can be effectively dispersed to various parts of the vehicle body from the apron rear panel 80 by way of the dash panel lower 11, the front side frame 20, the floor tunnel, and others, so that the deformation of the cabin can be suppressed effectively.

While the present invention has been described referring to the above-described embodiments, it should not be limited to these embodiments. For example, while the above-described embodiments use the partitioning member as the first reinforcing member 81 and the fourth reinforcing member 84, a foaming filling agent may be used in place of the partitioning member.

What is claimed is:

1. A front vehicle-body structure of a vehicle, comprising:
a hinge pillar extending in a vehicle vertical direction;
an apron reinforcement extending forward from the hinge pillar;
a connecting member provided below the apron reinforcement and connecting the hinge pillar and the apron reinforcement in a brace shape;
a dash panel provided in back of the connecting member and extending in a vehicle width direction;
a wheel house provided in front of the dash panel; and
an apron rear panel provided on an inward side, in the vehicle width direction, of and closely to the connecting member and connecting a rear portion of the wheel house and the dash panel,
wherein the connecting member has one end portion connected to a lower portion of the hinge pillar and an other end portion connected to the apron reinforcement, such that a gap exists between the connecting member and a front surface of the hinge pillar.

2. The front vehicle-body structure of the vehicle of claim 1, wherein a first reinforcing member is provided in a closed cross section which is formed by the connecting member, and said apron rear panel is provided on the inward side, in the vehicle width direction, of and closely to said first reinforcing member substantially at the same level as the first reinforcing member.

3. The front vehicle-body structure of the vehicle of claim 2, wherein said first reinforcing member is a partitioning member which partitions a space of said closed cross section into upper and lower parts.

4. The front vehicle-body structure of the vehicle of claim 1, wherein said connecting member comprises a first connecting member which extends forward from a portion of said hinge pillar which is positioned below said apron reinforcement and a second connecting member which connects a front end portion of the first connecting member and the apron reinforcement, and said apron rear panel is provided roughly horizontally substantially at the same level at an upper face portion of said first connecting member.

5. The front vehicle-body structure of the vehicle of claim 1, wherein a second reinforcing member is provided to extend in the vehicle width direction along a front face of said dash panel and forms a closed cross section between the dash panel and the second reinforcing member, and said apron rear panel is provided such that the apron rear panel overlaps said second reinforcing member when viewed from a forward side of the vehicle.

6. The front vehicle-body structure of the vehicle of claim 3, wherein a second reinforcing member is provided to extend in the vehicle width direction along a front face of said dash panel and forms a closed cross section between the dash panel and the second reinforcing member, and said apron rear panel is provided such that the apron rear panel overlaps said second reinforcing member when viewed from a forward side of the vehicle.

7. The front vehicle-body structure of the vehicle of claim 4, wherein a second reinforcing member is provided to extend in the vehicle width direction along a front face of said dash panel and forms a closed cross section between the dash panel and the second reinforcing member, and said apron rear panel is provided such that the apron rear panel overlaps said second reinforcing member when viewed from a forward side of the vehicle.

8. The front vehicle-body structure of the vehicle of claim 1, further comprising:
   a side panel constituting a vehicle-body side face portion; and
   a third reinforcing member provided in a brace shape to extend between a back face of said dash panel and an inward face, in the vehicle width direction, of said side panel,
   wherein said apron rear panel is provided such that the apron rear panel overlaps said third reinforcing member when viewed from the forward side of the vehicle.

9. The front vehicle-body structure of the vehicle of claim 6, further comprising:
   a side panel constituting a vehicle-body side face portion; and
   a third reinforcing member provided in a brace shape to extend between a back face of said dash panel and an inward face, in the vehicle width direction, of said side panel,
   wherein said apron rear panel is provided such that the apron rear panel overlaps said third reinforcing member when viewed from the forward side of the vehicle.

10. The front vehicle-body structure of the vehicle of claim 7, further comprising:
    a side panel constituting a vehicle-body side face portion; and
    a third reinforcing member provided in a brace shape to extend between a back face of said dash panel and an inward face, in the vehicle width direction, of said side panel,
    wherein said apron rear panel is provided such that the apron rear panel overlaps said third reinforcing member when viewed from the forward side of the vehicle.

11. The front vehicle-body structure of the vehicle of claim 1, wherein a fourth reinforcing member is provided in a closed cross section of said hinge pillar such that the fourth reinforcing member is positioned in back of and closely to a joint portion of the hinge pillar and said connecting member.

12. The front vehicle-body structure of the vehicle of claim 9, wherein a fourth reinforcing member is provided in a closed cross section of said hinge pillar such that the fourth reinforcing member is positioned in back of and closely to a joint portion of the hinge pillar and said connecting member.

13. The front vehicle-body structure of the vehicle of claim 10, wherein a fourth reinforcing member is provided in a closed cross section of said hinge pillar such that the fourth reinforcing member is positioned in back of and closely to a joint portion of the hinge pillar and said connecting member.

14. The front vehicle-body structure of the vehicle of claim 11, wherein said fourth reinforcing member is a partitioning member which partitions an inner space of said hinge pillar into upper and lower parts.

15. The front vehicle-body structure of the vehicle of claim 12, wherein said fourth reinforcing member is a partitioning member which partitions an inner space of said hinge pillar into upper and lower parts.

16. The front vehicle-body structure of the vehicle of claim 13, wherein said fourth reinforcing member is a partitioning member which partitions an inner space of said hinge pillar into upper and lower parts.

17. A front vehicle-body structure of a vehicle, comprising:
    a hinge pillar extending in a vehicle vertical direction;
    an apron reinforcement extending forward from an upper portion of the hinge pillar;
    a connecting member provided below the apron reinforcement, and having one end portion connected to a lower portion of the hinge pillar and an other end portion connected to the apron reinforcement;
    a dash panel provided in back of the connecting member and extending in a vehicle width direction;
    a wheel house provided in front of the connecting member;
    an apron rear panel provided on an inward side, in the vehicle width direction, of and closely to the connecting member and connecting a rear portion of the wheel house and the dash panel;
    a first reinforcing member formed in a plate shape and provided in a closed cross section which is formed by the connecting member, and said apron rear panel is provided on the inward side, in the vehicle width direction, of and closely to said first reinforcing member; and
    said apron rear panel and said first reinforcing member are facing the vehicle vertical direction, and are provided substantially at the same level to each other.

18. The front vehicle-body structure of a vehicle according to claim 17, wherein the first reinforcing member is located below an intersection point of the connecting member and the hinge pillar.

* * * * *